Figure 11:
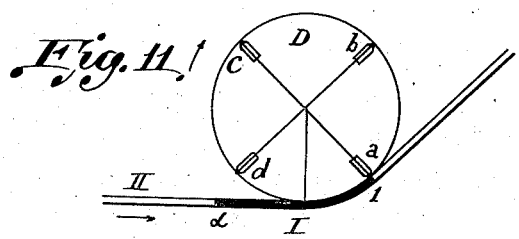

Aug. 22, 1939.  L. GABRILOVITCH  2,170,751
METHOD AND DEVICE FOR REDUCING AND INCREASING AUDIO FREQUENCIES
Filed March 6, 1937  3 Sheets-Sheet 1
Fig.1.
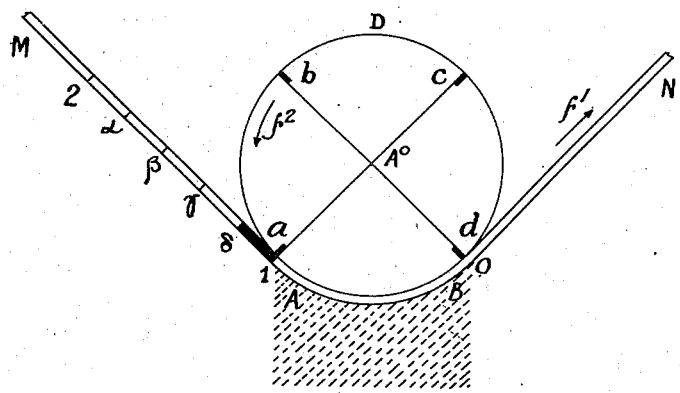
Fig.2.
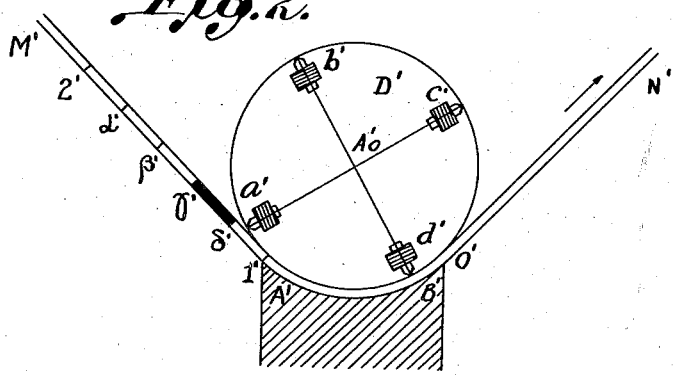
Fig.3.
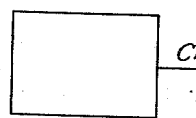
Reductor 1
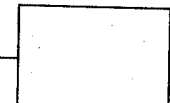
Receiver 1
Channel 1
Telephone
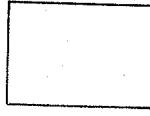
Reductor 2
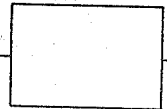
Receiver 2
Channel 2
Inventor.
Leonide Gabrilovitch
By Frank H. Borden
Attorney

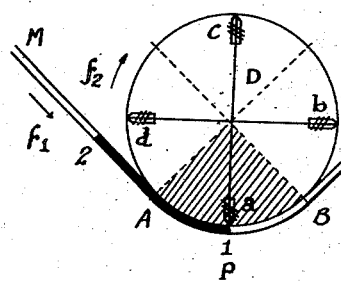
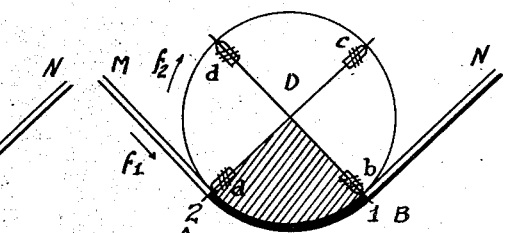
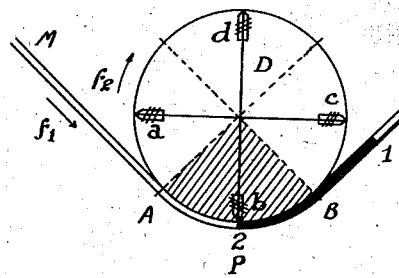
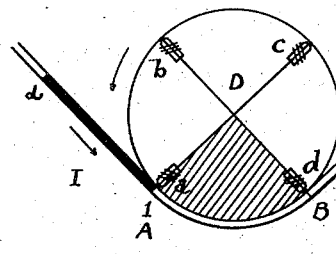
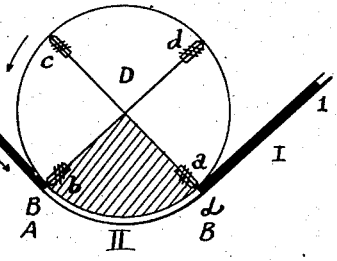
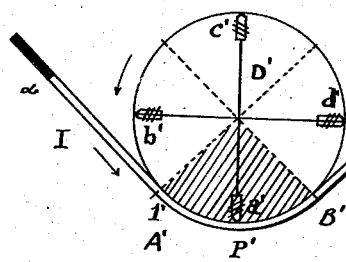
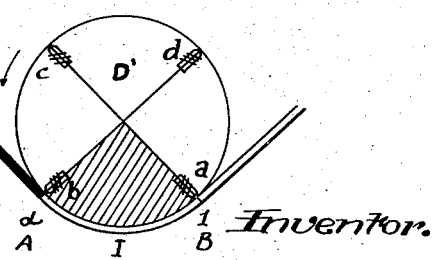

Aug. 22, 1939. L. GABRILOVITCH 2,170,751
METHOD AND DEVICE FOR REDUCING AND INCREASING AUDIO FREQUENCIES
Filed March 6, 1937  3 Sheets-Sheet 3

Inventor
Leonide Gabrilovitch
By Frank H. Borden
attorney

Patented Aug. 22, 1939

2,170,751

UNITED STATES PATENT OFFICE 2,170,751

METHOD AND DEVICE FOR REDUCING AND INCREASING AUDIO FREQUENCIES

Leonide Gabrilovitch, Paris, France

Application March 6, 1937, Serial No. 129,523
In France March 10, 1936

7 Claims. (Cl. 179—100.2)

The present invention aims to reduce the width of the band of frequencies constituting a telephonic or radiophonic communication by reducing the audio-frequencies at the emission and by increasing same at the reception so as to make reappear the inital frequencies.

The method can be utilized in the first place for resolving the following practical problems:

1. Transmissions of telephonic communications of good quality (for instance, constituted by a band of frequencies situated between 300 and 3000 cycles) through a cable of a bad quality cutting off practically all alternative currents of more than 2000-2500 cycles per second.

2. Establishing of several telephonic communications through an ordinary cable cutting off practically all currents of more than 5000-6000 cycles per second.

3. Reduction of the width of the sidebands of radiophonic emissions and augmentation connected thereto of the selectivity of radiophonic communications, and so forth.

When applied to telephony or radio-telephony it is the purpose of this invention to provide a method in accordance with which the speed of the incoming oscillatory phenomena is reduced while the total duration of every transmitted communication is continuously preserved.

To this effect the series of vibrations to be transformed (as regards their frequency) must be divided into intervals of convenient length; if reduction of frequencies is to be obtained, a certain number of these intervals should be omitted, whereas the remaining intervals are to be elongated in the time in appropriate proportions so that continuity of transmission is maintained; if increase of frequencies is aimed, no interval shall be omitted, all of them are to be contracted in the time, and some of them (or even all) should be reproduced twice or several times in the specified time.

The practical means of realization is based on utilization of magnetic or luminous record (inscription) of sounds on a steel ribbon, a wire or a film. It will be assumed hereinafter that the magnetic record of acoustic vibration on a steel ribbon (or wire, or disc) is utilized.

It is evident, however, that this means of recording may be replaced (without transgressing the limits of the present invention) by any other method of recording, as e. g., by the luminous recording used in the cinema ("talkies").

This recording is immediately followed by a reproduction at reduced speed of certain parts of the record (in case of reduction of frequencies) or by accelerated and repeated reproduction of all parts (intervals) of the record (in case of increasing the frequencies). For the purpose of transmitting the omitted parts of the record I prefer to use a parallel reading device constituting thus a parallel reproduction at reduced speed of the said omitted part.

When the reproduction is effected at a reduced speed, the frequencies of acoustic vibrations are reduced accordingly. In case of accelerated reproduction as compared to the frequencies of recording, the frequencies of acoustic vibrations are increased in the same proportions as that of the acceleration. It is obvious that, if the reproduction is $n$ times slower than the recording, $n$ units of time, e. g., $n$ seconds, are necessary to reproduce what was recorded within a single unit of time, e. g., one second. In such a way, if the duration of the reproduction should be the same as that of the recording, certain parts only of what has been recorded should be reproduced. The remaining parts of the recording may be reproduced by a parallel reading. The intervals to be reproduced by each device should rather be very short and the omitted parts should be determined in such a way that the reproduction at reduced speed should render the reproduction thoroughly continuous.

Let us suppose, for instance, that for a given acoustic frequency each interval will contain 25 vibrations and that the "reading" or reproduction shall be twice as slow as the recording; the reproduced intervals shall have the same length (the same duration) as the omitted parts; we will, thus, obtain a continuous reading as the reproduction of each section shall take twice as much time as its recording and will contain 25 vibrations of a frequency twice as low as the one of the recorded vibrations according to Doppler's law. If, at the reception, the transmitted frequency is doubled, there will be a continuous sequence of vibrations having the very same frequency as that of the sound to be transmitted.

This invention permits of accomplishing two different functions. In the first case, the omitted intervals are definitely cancelled so that only a half of the incoming vibrations is transmitted through the line and reach the receiving device; in the second case the space time intervals omitted by a given transmitting device are maintained by a parallel transmitter so that the totality of the incoming vibrations is conserved.

The first arrangement leads a message or intelligence of high quality, e. g., consisted by a band of frequencies situated between 0 and 5000, through a circuit of bad quality, e. g., through a circuit having a cut-off frequency of 2500 cycles. It is obvious, however, that under those conditions, a half of the initial vibrations disappear.

The second arrangement maintains all of the incoming vibrations by passing the message or the intelligence, divided into small space-time intervals, through two circuits of bad quality, e. g., by leading a message constituted by a band of frequency situated between 0 and 5000, through two circuits each of which has a cut-off frequency of 2500 cycles.

In accordance with the first function, the problem of the reception is solved in the present invention by doubling all the frequencies at the output of the line. This doubling is effected by a receiving device which is in all particularities similar to the transmitter, with the difference, however, that the record and the reading coils are moving in opposite directions.

This multiplication of frequencies is produced by a receiving device similar to the transmitting device described hereinafter and represented on Fig. 1 of the drawings; the mechanism of this multiplication of frequencies will be explained in the part of this specification dealing with Fig. 1.

In accordance with the second function, I propose to arrange both transmission and reception in the following manner.

At the emission, two lines and two transmitting devices are to be used, the two transmitting devices working out of phase in such a manner that the first of the transmitters is picking up and sending in the first line all uneven intervals of a message divided into portions, whereas the second transmitter is picking up and sending in the second line all even intervals of said emission.

The mechanism of the division of the message or intelligence into short space time intervals or portions is explained below in the part of this specification concerning Figure 1.

At the reception each of the two lines is leading to a receiving device constituting a frequency multiplier, the nature and functioning of which are disclosed in the explanation of Fig. 1. These two receivers are working out of phase, in such a manner that when the first receiver is reproducing the uneven intervals of the message, the second receiver remains silent, and when the second receiver reproduces the even intervals, the first receiver does not work.

It is obvious that the above-described arrangement comprising two transmitters, two lines and two receivers can be replaced by an installation comprising three transmitters, three receivers and three lines, or, generally speaking, by an installation comprising several transmitters and a corresponding number of lines and receivers. In order to abbreviate, I will call hereinafter an arrangement of two transmitters, two lines and two receivers a "duplex arrangement" or simply a "duplex", an arrangement of three transmitters, three lines and three receivers a "triplex" and in general, an arrangement of several transmitters and a corresponding number of lines and receivers a "multiplex".

A duplex arrangement is used when, at the emission it is desired to reduce the incoming frequencies two times and to effect at the reception a doubling of frequencies in order to reestablish the initial frequencies.

A triplex arrangement is utilized when at the emission the frequencies are to be reduced three times; under those conditions, a third part only of the incoming vibrations is led through each of the three lines; at the reception end the transmitted frequencies are multiplied three times so that the initial frequencies of the incoming vibrations are re-established.

It is obvious that the above-described duplex arrangements can be replaced by triplex, quadruplex or multiplex installations based exactly on the same principles. It will be necessary, however, to utilize for a triplex three lines, three transmitters and three receivers, for a quadruplex four lines, four transmitters and four receivers, and so on.

The multiplex arrangement is schematically represented on Figures 2 and 3 of the drawings.

The above-mentioned broad features of this invention can be understood from the drawings, in which:

Figure 1 represents a diagram of a frequency reductor.

Figs. 2 to 15 inclusive, represent diagrams of stages in the reduction or increase of frequencies.

Figures 16, 17:
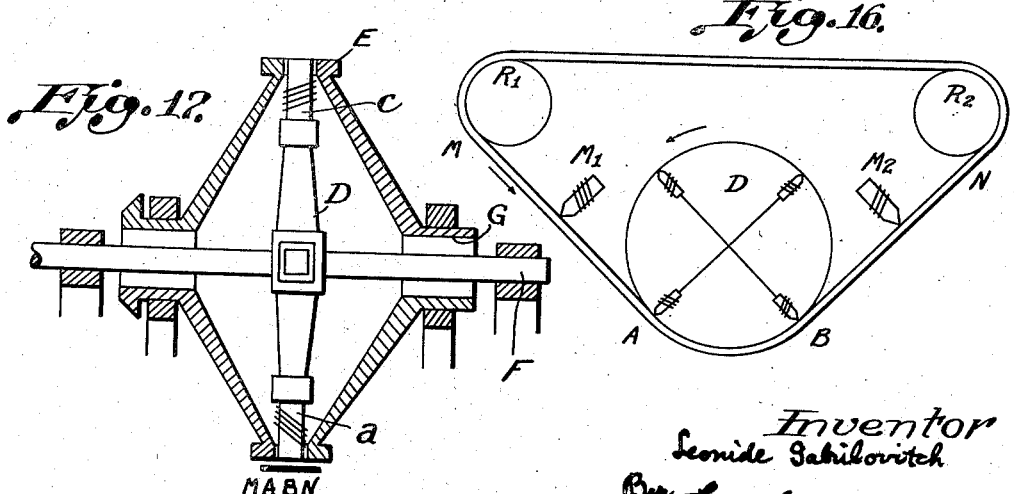

Fig. 16 represents a diagram of a complete assembly of the endless magnetic tape or ribbon with impressing and cleaning magnetic coils on opposite sides of the disc, and Fig. 17 represents a transverse section through the assembly of disc D.

It is assumed that this device is aimed to reduce the frequencies five times. M A B N is a film or ribbon of steel or any other ferro-magnetic substance possessing a certain magnetic retentivity. This ribbon is moving continuously in the direction M-N; it passes before an electromagnet, not represented on the drawings, through the winding of which pass the microphonic current produced by the acoustic vibrations; the variable flux passing through the core of this electromagnet impresses upon the surface of the ribbon M A B N a sequence of magnetic poles of different intensities. The said electromagnet is placed to the left of the point M, so that the whole portion of the ribbon M A B N situated between M and N is covered with a magnetic record of acoustic vibrations, the frequencies of which are to be transformed.

The part of the ribbon situated between the points A and B has the shape of an arc of a circle. Let us assume that this arc is a quarter of the whole periphery.

D designates a disc bearing on its circumference several coils with iron cores, arranged to be actioned by the magnetic recording situated on the ribbon M A B N. On Fig. 1 are shown four coils of this kind designated $a$, $b$, $c$, $d$ and placed at a distance of 90° from each other. It is obvious that these number and distance characterize but one of the possible embodiments of the device in question and are chosen as a mere example.

It is assumed that the disc D turns around its axis A in the direction indicated by the arrow $f^2$ and that the peripheral speed of D is equal to four-fifths of the speed of the ribbon M A B N, in the direction indicated by the arrow $f^1$. In the region situated between the points A and B, the region which will be called hereinafter the tangency region, the distance between the surface of the ribbon M A B N and the core of the coils $a, b, c, d$, becomes very small. Outside this region, this distance grows very rapidly on account of the recession of the point in question from A or from B. One may thus admit, to the first approximation, that the coils $a$, $b$, $c$, $d$ are impressed by the magnetic record only when they pass the tangency region. For a practical justification of this hypothesis, it suffices to give an appropriate form to the sections MA and BN of the ribbon M A B N, for instance, by bowing them in a convenient manner. On the diagram of Fig. 1 the section M A and B N have the form of straight segments tangent to the periphery of the disc D, or more precisely to the circular trajectory of the coils $a$, $b$, $c$, $d$.

Thereafter, let it be supposed that, at a given moment, the coil ($a$) is at the edge A of the tangency region and that, at this moment, the point 1 is situated on the ribbon M A B N at the very same point or edge A. As M A B N is moving more rapidly than the coil $a$, none of the points situated between the points 1 and 0 shall be able to impress the coil $a$ as the latter will never be in a position to reach them.

On the other hand, if one assumes that the part of the ribbon situated between the points $\alpha$ and 1, has the same length as the part situated between the points 1 and 0, and if one divides the segment 2—1 into five equal sections, namely, $2\alpha$, $\alpha\beta$, $\beta\gamma$, $8\delta$, $\delta1$ it is easy to see that while the coil $a$ moves from A to B, the point $\delta$ the speed of which is equal to five-fourths of the speed of the coil $a$ shall cover a distance the length of which shall be equal to five-fourths A B and, consequently, shall pass into B.

As to the points situated between $\delta$ and 2, none of them shall be able to reach, and consequently to impress, the coil $a$, because, when the latter shall pass into B, the part $2\delta$ will occupy the tangency region (2 being at the point A and $\delta$ at B). At this moment, however, the coil $b$ 90° distant from the coil $a$, shall be at the point A. Coil $b$ will therefore not be able to be impressed by any of the points situated between 2 and $\delta$ as all these points will pass through the tangency region before coil $b$ enters it because the speed of coil $b$ is less.

Consequently the part 2—$\delta$ of the record shall impress none of the reproducing coils. Nevertheless, the reproduction shall be perfectly continuous as at the moment when the coil $a$ will have finished the reproduction of the section $\delta$—1 of the record, the coil $b$ will begin reproducing the section M—2 situated behind the point 2.

It is obvious that the reproduction of the section $\delta$—1 shall last exactly the same time as the passage of the coil $a$ from the point A into B, i.e., the reproducing shall be five times slower than the recording.

Generally speaking, in order to reduce $n$ times the frequency, it is necessary that the speed V of the ribbon M A B N be connected with the peripheral speed $V_p$ of the coils $a$, $b$, $c$, $d$, by the following relation:

$$V = V_p - \frac{V_p}{n-1}$$

Obviously, this presents its results as a result of the proposition that the frequencies emitted in one system and observed from another system moving with respect to the former are influenced by the relative motion of both systems, as voiced by Doppler.

Let us consider now, what are the conditions under which the device schematically represented on Fig. 1 can work, not as a frequency reducer but as a frequency multiplier.

Let it be assumed that the band M A B N bearing the record and the disc D carrying the reading coils are moving in opposite directions.

If the disc and the ribbon are moving at the same speed, the device will work as a doubler of frequencies.

The mechanism of this multiplication of frequencies is made understandable by the diagrams represented on Figs. 4, 5 and 6; these three diagrams show the same device as that represented schematically on Fig. 1 and, in a more concrete manner, on Fig. 17.

It is assumed that the disc D and the ribbon M A B N are moving at the same speed, the disc D in the direction indicated by the arrow $f^2$ and the ribbon M A B N in the direction indicated by the arrow $f^1$.

As above, the part of the periphery of the disc D situated between the points A and B will be called the "tangency region". The interval of time during which each of the reading coils $a$, $b$, $c$, $d$ is passing this tangency region, i. e., during which it is moving from the point B to the point A is designated by T.

The three diagrams represented on Figs. 4, 5 and 6 show the mechanism of the reproduction by the reading coils $a$ and $b$ of the portion of the magnetic record situated on the ribbon M A B N between the points 1 and 2 and having the same length as that of the tangency region A B.

It may be assumed that at the beginning of the "reading" or reproduction (at the moment $T=0$), the coil $a$ is "touching" the point 1, i. e., that at the moment $T = 0$ this coil is situated close to point 1, which at the same moment is located in the point P which represents the middle point of the tangency region A B.

Fig. 5 represents the relative positions of the record 1—2 and of the coils $a$ and $b$ after an interval of time equal to $$\frac{T}{2}$$

has elapsed from the beginning of the "reading" i. e., from the moment $T=0$.

One can see that the coil $a$ is now situated on point A, having traversed a half of the tangency region, namely, the arc P—A and having met during this movement the totality of the points constituting the portion of the magnetic record situated between the points 1 and 2. It is obvious, in fact, that during the interval of time $$\frac{T}{2}$$

the point 1 which at the moment $T=0$.

One can see that the coil $a$ is now situated on point A, having traversed a half of the tangency region, namely, the arc P—A and having met during this movement the totality of the points constituting the portion of the magnetic record situated between the points 1 and 2. It is obvious, in fact, that during the interval of time $$\frac{T}{2}$$

the point 1 which at the moment $T=0$ was situated on point P, has reached the point B, so that at the moment when coil $a$ arrives at A the portion of the record 1—2 occupies the tangency region, point 1 having reached B and point 2 being located at A. That means that during the interval of time $$\frac{T}{2}$$

the coil $a$ has been impressed by all the magnetic poles constituting the portion 1—2 of the record and this coil has, therefore, reproduced the whole of this portion. As the recording of said portion is effected during the interval of time T, it is evident that the reproduction caused by coil a doubles the speed of all oscillatory phenomena constituting the original message, i. e., that reproduction is doubling all incoming frequencies by the operation of Doppler's law.

Fig. 6 shows the relative positions of the recording coils and of the portion 1—2 of the record after a second interval of time equal to $$\frac{T}{2}$$

has elapsed from the beginning of the reading, i. e., from the moment $T=o$.

During this time interval the coil a will not be able to reproduce any part of the record as this coil will be out of the tangency region. On the contrary, coil b travels from the point B to the point P and meets during this movement all the points constituting the portion 1—2 of the record. Under these conditions this portion is reproduced twice: first by the coil a during the movement of this coil from point P to point A, and again by the coil b, during the movement of this coil from point B to point P.

It is evident that, although all the frequencies constituting the message are doubled, there will be no rupture or break of continuity in the reading. The compression of the duration of the oscillatory phenomena will be compensated by their repetition, so that, the total duration of the reproduction will be exactly the same as the total duration of the recording.

It is easy to prove by the help of Doppler's equation, that if the coils are moving $n$ times as fast as the ribbon M A B N, the speed of the oscillatory phenomena will be increased $(n+1)$ times so that the reproducing device will multiply $(n+1)$ times all incoming frequencies.

At the same time each portion of the record (the length of said portion being the same as that of the tangency region) will be reproduced $(n+1)$ times so that there will be no rupture of continuity of the reading and that the total duration of reproduction shall be exactly the same as the total duration of recording.

The transmitting device represented schematically on Fig. 1 is designed, as has been explained, to reduce the incoming frequencies five times (this rate of reduction depending exclusively upon the proportion of the speeds of the coils and of the ribbon). By reducing the incoming frequencies five times, said device is omitting four-fifths of the original vibrations, so that the total duration of the reproduction remains exactly the same as the total duration of the recording, the reading being perfectly continuous.

Let it be assumed that the windings of the reading coils are connected with a telephonic line. Under those conditions, the device represented schematicaly on Fig. 1 will send in said line a continuous sequence of electrical oscillations corresponding to a fifth of the incoming vibrations, each of said oscillations having a period five times greater than that of the corresponding incoming vibration.

Let it now be assumed that the output of the line is connected with a receiving device similar to the transmitting device as represented schematically on Fig. 1, but being characterized by the fact that its reading coils and its ribbon are moving in opposite directions, the speed of the coils being four times greater than that of the ribbon.

Under these conditions this receiving device shall work as follows (as has been explained above):

1. It will multiply five times all incoming frequencies compressing five times their duration.
2. It will repeat five times each portion of the record (the length of each of these portions being equal to that of the tangency region).
3. It will let appear, in this way, a continuous sequence of vibrations having exactly the same frequencies as the original ones, said sequence being constituted by five times repeated portions each of which is corresponding to a single portion of vibrations maintained by the transmititng device.

If the cancellation of four-fifths of the short space time intervals or portions, into which is divided the message to be transmitted by the transmitting device, does not make this message understandable, or hardly understandable, one may by the help of the above-described arrangement (i. e., by the help of a transmitting device reducing the incoming frequencies placed at the input of the line, and of a receiving device multiplying the incoming frequencies placed at the output of the line) effect the transmission of a message by letting pass through the line a band of frquencies five times more narrow than that constituting originally the message to be transmitted.

A line having a low cut-off frequency can thus be utilized for the simultaneous transmission of several communications.

The series of operations constituting this form of transmission of messages, may be outlined as follows:

A. At the emission: (1) recording; (2) division in short portions, each of which has the same length as that of the tangency region; (3) reproducing ("reading") by omitting a certain part, e. g., ½, ⅓, ¼ and so on, of the total number of the said portions and by expanding in a corresponding proportion the remaining portions so as to form a continuous sequence of oscillations.

B. At the reception: (1) recording at the output of the line; (2) division in portions, each of which has the length of the tangency region; (3) reproducing of all portions by repeating each of them a certain number of times each portion being correspondingly compressed.

It is obvious that one may utilize at the emission two simultaneously working transmitting devices both being constructed like that represented schematically on Fig. 1 and in a more concrete manner on Fig. 16, but differing one from another by the length of the tangency region. The coils of the first device must have exactly the same speed as those of the second and the two ribbons must also move in perfect synchronism. Under those conditions the two devices will differ one from another only by the length (duration) of the space time intervals or portions in which they divide the message or intelligence to be transmitted. The utility of such a combination of two transmitting devices is outlined hereinafter.

If one wants to transmit a message of high acoustic quality (e. g., a speech constituted by a band of frequencies situated between 300 and 3000 cycles) through cables having a very low cut-off frequency (e. g., of 1500 cycles), this problem can be easily resolved by the help of the above described method of reducing and increasing audio-frequencies.

As has been disclosed above, it suffices, for obtaining this result, to utilize, at the emission, two, or several, transmitting devices connected each with the input of a separate line; at the reception two, or several, alternatively working receiving devices are to be used connected each with the output of a special line.

The functioning of two transmitting devices sending each through a separate line one-half of the total number of small portions in which the message is divided, can be made understandable by the help of the diagrams represented on Figs. 7, 8, 9 and 10.

The two transmitters have entirely identical characteristics and differ only by the relative position of the coils and the corresponding points of the two records.

It is assumed that on Fig. 7 and Fig. 8 the corresponding points of the record are designated by the same notations, e. g., by I and I'. The two ribbons of the two devices are moving in perfect synchronism in such a way that the two corresponding points, namely I of the Fig. 7 and I' of Fig. 8 enter simultaneously in the tangency region A B. At this moment the coil $a$ in Fig. 7 is situated in the point A and is touching therefore the point I, whereas the coil $a'$ of Fig. 8 is situated in the point P' which is the middle point of the tangency region A' B' and is therefore distant from the point I' for 45°.

As the two transmitters are designed to reduce the incoming frequencies two times, the ribbons in both devices must move two times faster than the coils.

Under those conditions, at the moment when the coil $a$ in Fig. 7 reaches the point B, the point $\alpha$ of the record will reach the same point, and the portion I of the record situated between the points I and $\alpha$, shall be out of the tangency region, this whole portion having been reproduced by the coil $a$.

It is evident that the portion II of the record situated behind the portion I, between the point $\alpha$ and $\beta$ will never be read by the device represented on Figs. 8 and 9.

On the contrary, it is easy to see that the device represented on Figs. 8 and 10 shall reproduce the portion II by omitting the portion I.

Generally speaking, one may say that the first of the two devices will pick up and reproduce all the uneven portions of the record and omit all the even portions, whereas the second device will omit all of the uneven portions and pick up and reproduce all the even portions. Both will expand the oscillations thus reproduced in such a way that each of the devices will send to the line with which it is connected a continuous sequence of oscillations.

At the reception end, two alternatively working receiving devices are to be utilized. The functioning of these two receivers is illustrated by the diagrams represented on Figs. 11, 12, 13, 14 and 15.

Figure 12:
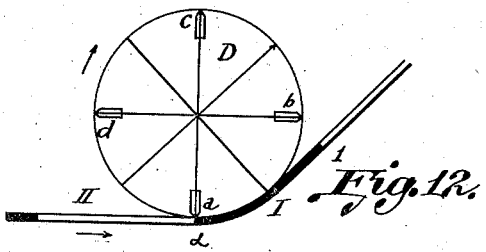
Figure 13:
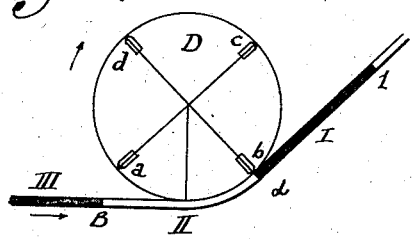
Figure 14:
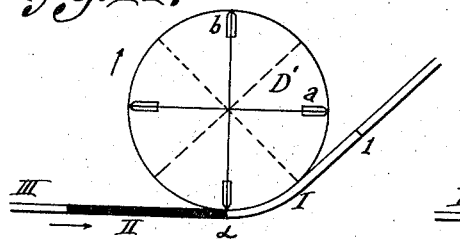
Figure 15:
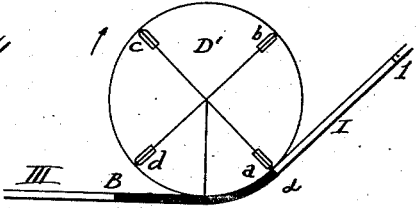

The diagrams of Figs. 11, 12 and 13 show the first of the two devices in three different positions; the Figs. 14 and 15 show the second device in two different positions.

Both devices are exactly similar to the receiving device represented on the diagrams of Figs. 4, 5 and 6 described above. They differ from these devices by a sole feature, namely, by the fact that their tangency region is two times smaller than the tangency region of the devices represented on Figs. 4, 5 and 6. This particularity has been introduced in the receivers in order to avoid the repeating of each reproduced portion as it was the case in the receiving devices represented on Figs. 4, 5 and 6. Instead of repeating a given portion of the record, the devices we are considering reproduce each picked up portion only once, and after this reproduction break the reading for a time interval equal to that during which the reproduction of a single portion is effected.

As in the two devices the position of the coils with regard to the tangency region is different for 45°, the second device is silent when the first is working and vice-versa. It is obvious that if the first of the two devices is picking up the uneven portions of the message, the second is omitting them and picking up the even portions of this message.

It is easy to apply the considerations concerning an arrangement of two transmitting devices and two receiving devices to an installation comprising several transmitting devices and a corresponding number of receivers.

In Figure 16, M A B N is the ribbon bearing the magnetic record impressed on said ribbon by the electromagnet $M_1$. Magnet $M_2$ is provided to sweep out the magnetic record. The band M A B N is guided and moved by the rollers $R_1$ and $R_2$. In Fig. 17 is shown a section through the disc D carrying the reading coils and the means for guiding the band M A B N.

As the speed of the ribbon is in many cases not equal to that of the coils, the guiding part E of the device is not fixed on the same axis as that bearing the coils. The latter (F) passes through the first (G), and can therefore be moved independently.

Fig. 2 represents a diagram of a second transmitter in all details similar to that represented on Fig. 1, but functioning out of phase with regard to this latter due to the fact that the position of the reading coils with regard to the record is not the same in the two devices.

The ribbon M' A' B' N', represented on Fig. 2, is moving synchronously with the ribbon M A B N, represented on Fig. 1, so that the corresponding points of the two ribbons are bearing the same magnetic record and enter simultaneously in the tangency region A B.

Under these conditions, it is easy to arrange things in such a manner that the device represented on Fig. 1 will omit the interval $\delta$—$\gamma$ and maintain the interval I—$\delta$ whereas the device represented on Fig. 2 will omit the interval I'—$\delta'$ and maintain the interval $\delta'$—$\gamma'$.

For obtaining this result, it suffices to bring the discs D and D' in such positions, that $a$ shall enter in the tangency region simultaneously with the point I, whereas $a'$ shall enter in the tangency region simultaneously with the point $\delta$.

If the device represented on Fig. 1 and the device represented on Fig. 2 are connected with two different lines, the first of the two devices will send in the first line a determinate series of intervals forming a fifth of the message. Fig. 3 represents schematically a diagram of an installation formed by two parallel transmitters, two parallel lines and two parallel receivers.

The above-described cinematic process of reduction of acoustic frequencies can secure a most faithful transmission of speech and music, provided the following conditions are described in the practical embodiment of the instrument.

If the periods of reproduction and of non-reproduction of a given reproducing unit (i. e., the sections of record reproduced or omitted during reading) are relatively long (e. g., say, of one-tenth of a second for the omitted part, and from one-fortieth to one-twentieth of a second, for the reproduced parts), the sounds with a very short duration, such as, for instance the explosive consonants, with a duration of less than one-fortieth of a second, can be eliminated by the reproduction, if they fall into the omitted intervals. On the contrary, reproduction and non-reproduction for relatively short periods, say one-one hundredth of a second for the omitted sections and from 1/400 to 1/200 of a second for the reproduced sections, would conserve the short sounds, none of which has a duration of less than one-sixtieth of a second, but will eliminate a part of the slow vibrations such as those the half period of which exceeds the duration of the reproduced sections.

In order not to deform the speech and music, it will thus be necessary to use two, or several, parallel recordings with two, or several, corresponding parallel reproductions by taking special care of:

1. Effecting the two records with an absolutely identical speed;
2. Giving both readings exactly the same degree of speed reduction in relation to the speed of the recording;
3. Choosing properly the periods of reproduction and non-reproduction for each of the two recordings, so that these periods can be relatively long for one of the recordings and relatively short for the other.

Under these conditions, the first recording will maintain the slow vibrations by eliminating a part of the short sounds, whereas the second one will keep the short sounds by abolishing a part of the slow vibrations.

It is evident that the combination of the two readings will so keep both the short sounds and the slow vibrations and shall thus render possible a most faithful transmission of speech and music.

Two or several parallel recordings combined with two or several correspondent parallel reproductions, the periods of reproduction and non-reproduction being the same for all of them while the part omitted in one system will be reproduced in the other and vice-versa. If every reproduced part from each system is transmitted through a separate wire or by a separate wave, the sum of these transmissions after a proper increase of frequencies and the re-establishment of the initial order, will form the complete and absolutely faithful image of the original emission.

The above-described combinations can be embodied practically as by using two steel bands moving with the same speed and being impressed by two stationary recording electromagnets actuated by the same microphonic current. Both reproductions should be effected by two systems of reading coils disposed for instance, on two discs fixed on the same axis, both systems functioning in the same manner, with the only difference that the "tangency region" A B (determined above and represented on Fig. 1 of the drawings) is smaller for one of the systems and that the number of reading coils of this system is increased accordingly.

It is evident, also, that the disposition shown on Fig. 1 of the drawings, is given but as an example and that, without transgressing the limits of the present invention, one could permute the places occupied by the reproduction coils and the recording, i. e., to place the latter on a rigid ring or on the periphery of a disc like D and, on the contrary, to fix the coils on a flexible band or a belt, such as M A B N or else to eliminate all flexible bands and place the coils and the record on two or several rings or discs moved with properly chosen angular speeds.

What is claimed is:

1. A device for reducing audio-frequencies comprising means for recording the vibrations to be transmitted on a ferro-magnetic wire or band, means for reproducing and transmitting such record at a reduced speed by at least one reading coil the core of which undergoes the magnetic influence of the record to be reproduced, said coil moving continuously in the same direction as the wire bearing the record but at a lower speed, effecting reproduction only periodically during the intervals of time during which the reading coil is at a sufficiently small distance from the record that owing to the disposition of the coil certain parts only of the record are reproduced and means for recording and reproducing the transmitted periodic frequencies at an increased speed substantially that of the original frequencies comprising a moving coil and a ferro-magnetic wire or band, said coil moving continuously in the same direction as the wire but at a higher rate.

2. In a signal transmitting system means effectively dividing the signals into space-time intervals, omitting one such interval, and means for reproducing and transmitting the remaining interval in the total time of the intervals so as to reduce the frequencies of the signals, and means for reproducing the transmitted signals in such manner as to increase the frequencies to their original value and time interval and to repeat such last mentioned frequency.

3. In a signal transmitting system, means for receiving the signals, means effectively dividing the signals into space-time intervals relative to the first means, means for reproducing certain selected space-time intervals of the signals while omitting others in a time interval the sum of all of the space-time intervals in order to lower the frequencies of the signals, synchronous means for reproducing and transmitting the omitted space-time signal intervals at lowered frequencies during the same total time interval, and means for reproducing the respective transmitted signals in such manner as to increase the frequencies to their original value and space time relationship.

4. The method of transmitting signals which consists in effectively dividing the signals into space-time intervals, omitting an interval of a given total of space time intervals, reproducing and transmitting the remaining intervals of the total in the total time for the sum of the space time intervals thus decreasing the frequencies of the reproduced signals, reproducing and transmitting simultaneously the omitted intervals of signal in reduced frequency, then reproducing the respective transmitted signals in such manner as to increase the frequencies to their original value and space time relationship.

5. The method of transmitting signals which consists in omitting certain frequencies and reducing at the emission all of the remaining frequencies constituting the message to be transmitted, while maintaining the same time factor of transmission as the original message, and then, at the reception in reestablishing the initial frequencies of the emitted reduced frequencies while maintaining the same space time interval substantially as the initial message.

6. A method for transmitting signals which consists in securing relative motion between means responsive to primary acoustic frequencies and a system comprising secondary frequency responsive means thereby reducing at the emission all of the frequencies constituting the message or signal while maintaining the total duration of the message as initially transmitted, by virtue of Doppler's equation, and then in reproducing the initial frequencies by securing relative motion between means responsive to the secondary frequencies and a system comprising a second primary frequency responsive means thereby reducing at the reproduction all of the frequencies constituting the message while maintaining the total duration of the message as initially transmitted, also according to Doppler's equation.

7. A method of transmitting and receiving signals, which consists in recording the signals, omitting portions of the signals, transmitting portions of the recorded signals at a reduced frequency which is a function of the time relation of the selected intervals to the total time intervals to fill the same total time interval, and in reproducing the transmitted signals in such manner that they have their initial higher frequency and disposition in the same total time interval.

LEONIDE GARBRILOVITCH.